United States Patent [19]

Silvers, Jr.

[11] Patent Number: 4,604,787

[45] Date of Patent: Aug. 12, 1986

[54] TOOL CHANGER FOR MANIPULATOR ARM

[75] Inventor: Ralph H. Silvers, Jr., Arlington, Va.

[73] Assignee: Transamerica Delaval Inc., Los Angeles, Calif.

[21] Appl. No.: 641,060

[22] Filed: Aug. 15, 1984

[51] Int. Cl.⁴ .............................................. B23Q 3/12
[52] U.S. Cl. .................................... 29/568; 29/26 A; 414/730; 901/30
[58] Field of Search ........................... 29/26 A, 568; 414/744 R, 749, 730; 901/30, 29, 41

[56] References Cited

U.S. PATENT DOCUMENTS

| | | | |
|---|---|---|---|
| 3,530,570 | 9/1970 | Shotter | 29/568 |
| 3,953,039 | 4/1976 | Hauge | 29/568 |
| 4,046,263 | 9/1977 | Cwycyshyn | 29/26 A |
| 4,122,598 | 10/1978 | Pegler | 29/568 |
| 4,145,802 | 3/1979 | d'Auria | 29/568 |
| 4,164,879 | 8/1979 | Martin | 29/568 |
| 4,310,958 | 1/1982 | Balaud | 414/744 R |
| 4,358,888 | 11/1982 | Zankl | 29/568 |
| 4,486,928 | 12/1984 | Tucker | 29/26 A |

Primary Examiner—Jimmy C. Peters
Attorney, Agent, or Firm—Harris, Kern, Wallen & Tinsley

[57] ABSTRACT

A tool changer for use with the manipulator arm of a robot or the like. A tool changer in which the manipulator arm is engaged with the end effector carrying the tool by a simple linear motion, and disengaged by a linear motion in the opposite direction, without requiring any separate control functions such as switch actuation or the like. A tool changer which also provides for transmitting mechanical, electrical or fluid power and/or control between the manipulator arm and the end effector, and one which can be utilized with any type of tool, sensor, transducer, and the like. A tool changer incorporating a coupling which is closed by an axial compression force and opened by an axial tension force, and an end effector rack for receiving and supporting a plurality of end effectors so that a manipulator arm can position an end effector in the rack with a lateral movement, disengage the arm from the end effector with an axial movement, engage the arm with another end effector by an axial movement in the opposite direction, and remove the new end effector by a lateral movement.

9 Claims, 10 Drawing Figures

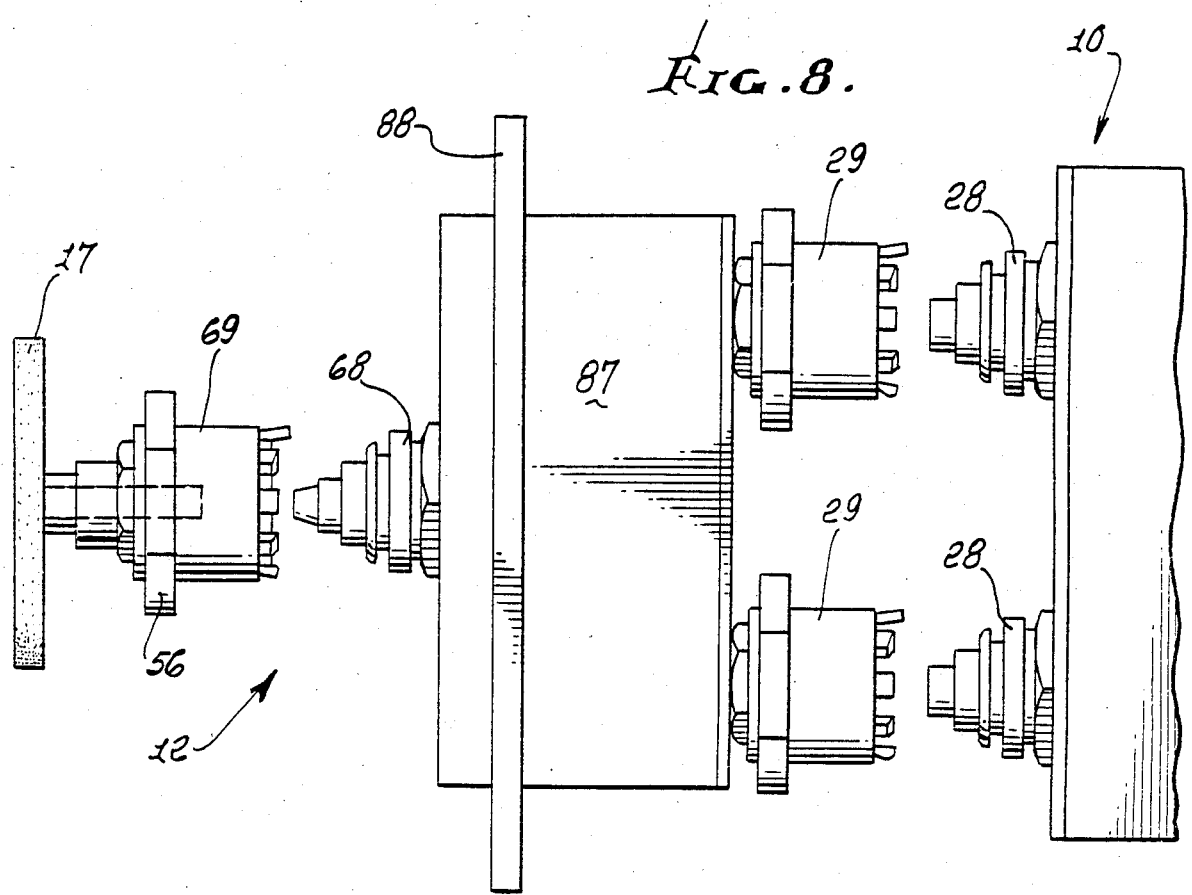
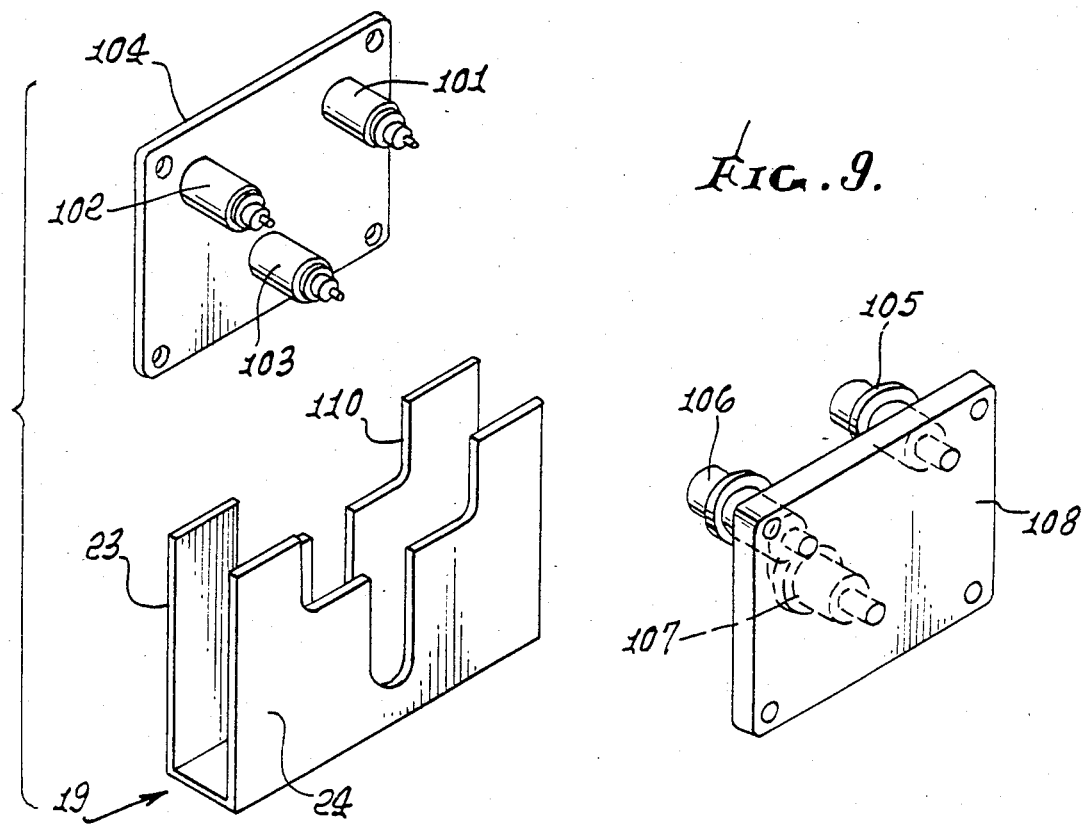

TOOL CHANGER FOR MANIPULATOR ARM

BACKGROUND OF THE INVENTION

This invention relates to a manipulator arm such as are in common use today with robot like equipment, and in particular to a new and improved apparatus for changing of tools and the like which are carried by manipulator arms.

In a conventional configuration, an arm is remotely controlled, often automatically by a predetermined program, for moving a tool or the like along various paths to accomplish various desired aims. The tool or other item carried by a manipulator arm is often referred to as an end effector, and that nomenclature will be used herein. During the use of the manipulator arm, it is often desired to utilize more than one end effector in an operating sequence and therefore it is necessary to change end effectors between steps of the sequence.

Various arrangements are utilized for changing end effectors with manipulator arms, including various arrangements for manually connecting and disconnecting the end effector.

Automatic machine tools which perform a variety of metal working operations in sequence have been developed and automatic changing of tools is a feature in many of these machines. Two such devices are shown in U.S. Pat. Nos. 4,204,303 and 4,216,572. In these devices, a plurality of tools is positioned in a frame located between a drive source and the work piece. In operation, the frame is rotated to place the desired tool in line between the drive source and the work piece, and then the drive source is actuated to engage the tool and perform the desired operation. The type of work which can be performed by this type of equipment is severely limited, in contrast to the work which can be performed by the robot type manipulator arm having many degrees of freedom in the motions available.

Another type of end effector or tool changer is shown in U.S. Pat. No. 4,145,802. In this device, a plurality of tool carriers is mounted in a rack, and a power source is movable to be selectively positioned at each of the end effectors. The power source is engaged with the selected end effector by energizing an electromagnet which holds the end effector to the power source and engages the tool drive mechanism. This type of device suffers from the disadvantage of requiring a separate control function, namely energizing and deenergizing of an electromagnet, in order to effect the engagement of the power source with the end effector.

Accordingly, it is an object of the present invention to provide a manipulator system tool changer for using more than one end effector in the performance of one or more operations without need for manual attachment or detachment or for the use of any other powered or mechanical means or transmission of signals for the attachment or detachment of different end effectors. A further object is to provide for automatic changing of the end effector by means of a linear motion of the attachment point of the manipulator arm.

The tool changer system of the invention permits the use of multiple end effectors in circumstances in which manual or separately powered or signaled detachment and attachment means would not be practical or would increase work cycle time. The manipulator arm may be under direct manual control, remote manual control, manual control through a processing system, and automated control, as in manipulator arms which constitute or are elements of cam-operated machines, material handling and transfer devices, and robots. While tools are usually referred to herein as being carried by the end effector, the invention is not limited to a conventional cutting tool or wrench or the like, and the word "tool" is used broadly to include all types of devices used by robot type equipment, including sensors, transducers, hands, scoops, etc.

It is an additional object of the invention to provide a tool changer suitable for remote control operation of a manipulator arm which might be stationary or vehicular-mounted to increase the nature of tasks which may be accomplished, and to remove and to replace worn or broken end effectors. Holders with alternative end effectors can be mounted on the carriage of mobile manipulators, with manipulator action necessary to accomplish the detachment and attachment of different end effectors performed by remote control, or by pre-programmed automatic triggered manual control, sensor signal, accumulated time or work cycle.

A further object of the invention is to provide an automatic tool change system suitable for use on a flexible machine assembly station in manufacturing to permit a single manipulator to accomplish a wide range of actions such as: workpiece pick and place; sensor manipulation for code reading; camera manipulation for remote viewing, image recording, and workpiece orientation determination; pick and place of a variety of shapes requiring different end effectors to allow manipulation of the workpiece, gauges, packing materials, and replacements of worn cutting heads; performing cutting, grinding, burnishing, polishing, drilling, and other operations upon the workpiece by the manipulation of powered equipment or through the action of the manipulator in its movement of the end effector; cleaning, coating, abrading, and heating operations using gas or liquid flow through the system through a nozzle involving one or more gases and/or fluids and with the capability to incorporate reservoirs for fluid, dust and gas; performing flame treatment operations as by the manipulation of a torch nozzle and ignitor, and incorporating the operating signal, igniting energy, and gas and fluid flow through the system or by incorporation of appropriate reservoirs.

It is an additional object of the invention to provide a tool changer with which energy may be transmitted from the manipulator arm to the end effector. Such an energy transmitting manipulator end effector system allows industrial robots to service one or more machine tools or other processing equipment with capability to handle, perform sensory operations upon, and perform processing work efforts upon, a wide variety of workpieces, gauges, and tools in support of flexible machining processes. Use of robots in flexible assembly operations and the automation of assembly involving a variety of shapes, sizes, and operations to be performed has been restricted by the limited capacity of even multifunctional end effectors. The system of the present invention allows the robotic manipulator to be programmed to automatically change end effectors which permits the manipulation of a wide variety of objects, and the performance of tasks necessary in the course of assembly such as placing and fastening by rivet or bolt, forming quality control checks during assembly operations, and operating with grippers requiring controlled but wide range of gripping force to handle objects of different size, weight, and sensitivity to force.

It is an object of the invention to provide a system which allows manipulators to detach and attach different end effectors through a simple one-motion operation without need for additional power or signals to accomplish the attachment and detachment. Such a system greatly increases the flexibility of use of manipulators and provides for the transmission of energy and communication through secure, safe, and non-leaking connections made between components of the system.

It is a particular object of the invention to provide such a tool changer incorporating a two member coupling, with one member carried by a manipulator arm and the other member carried by an end effector, with the coupling member being engaged by a compression force and disengaged by a tension force, i.e., operated by a simple push and pull motion without requiring additional motions or control functions. The coupling member may be constructed integral with the manipulator arm and/or end effector or tool, or may be separately constructed and attached by conventional means.

Other objects, advantages, features and results will more fully appear in the course of the following description. Preferred embodiments of the present invention are given by way of illustration or example in the drawings and description.

SUMMARY OF THE INVENTION

A tool changer for use with a manipulator arm which provides a first movement along an axis and a second movement laterally to the axis. The tool changer includes a coupling having interengaging nipple and socket members with one of the members including means for connecting the member to the manipulator arm and with the other of the members including means for connecting the member to an end effector and flange means for engaging an end effector rack. The coupling members may be constructed integrally with the manipulator arm and end effector, or may be be attached thereto by conventional means. The tool changer also utilizes an end effector rack for receiving and supporting one or more end effectors, with the rack having means interengaging with the coupling member flange means preventing movement of the end effector along the axis of the coupling, while permitting movement laterally. With this configuration, the manipulator arm can position an end effector in the rack by a lateral movement, disengage the arm from the end effector by an axial or pulling movement, engage the arm with another end effector in the rack by an axial or pushing movement, and remove the end effector by a lateral movement, thereby effecting the tool change with simple manipulator arm movements without requiring separate manual activity or separate control functions and without limiting the working positions of the manipulator arm or end effectors. The couplings may be constructed to transmit mechanical motions, linear or rotary, between the manipulator arm and the end effectors, to transmit electrical power or electrical signals, and to transmit fluids with one way or two way flow paths, for power transmission or control or the like.

BRIEF DESCRIPTION OF THE DRAWINGS

FIG. 8 is a view similar to the preceding FIGS. 2–7 illustrating couplings suitable for two way transmission of fluids; and FIG. 9 illustrates an alternative form of coupling and an end effector rack suitable for multiple transmission of power, signals, and/or control.

DESCRIPTION OF THE PREFERRED EMBODIMENTS

Figure 1:
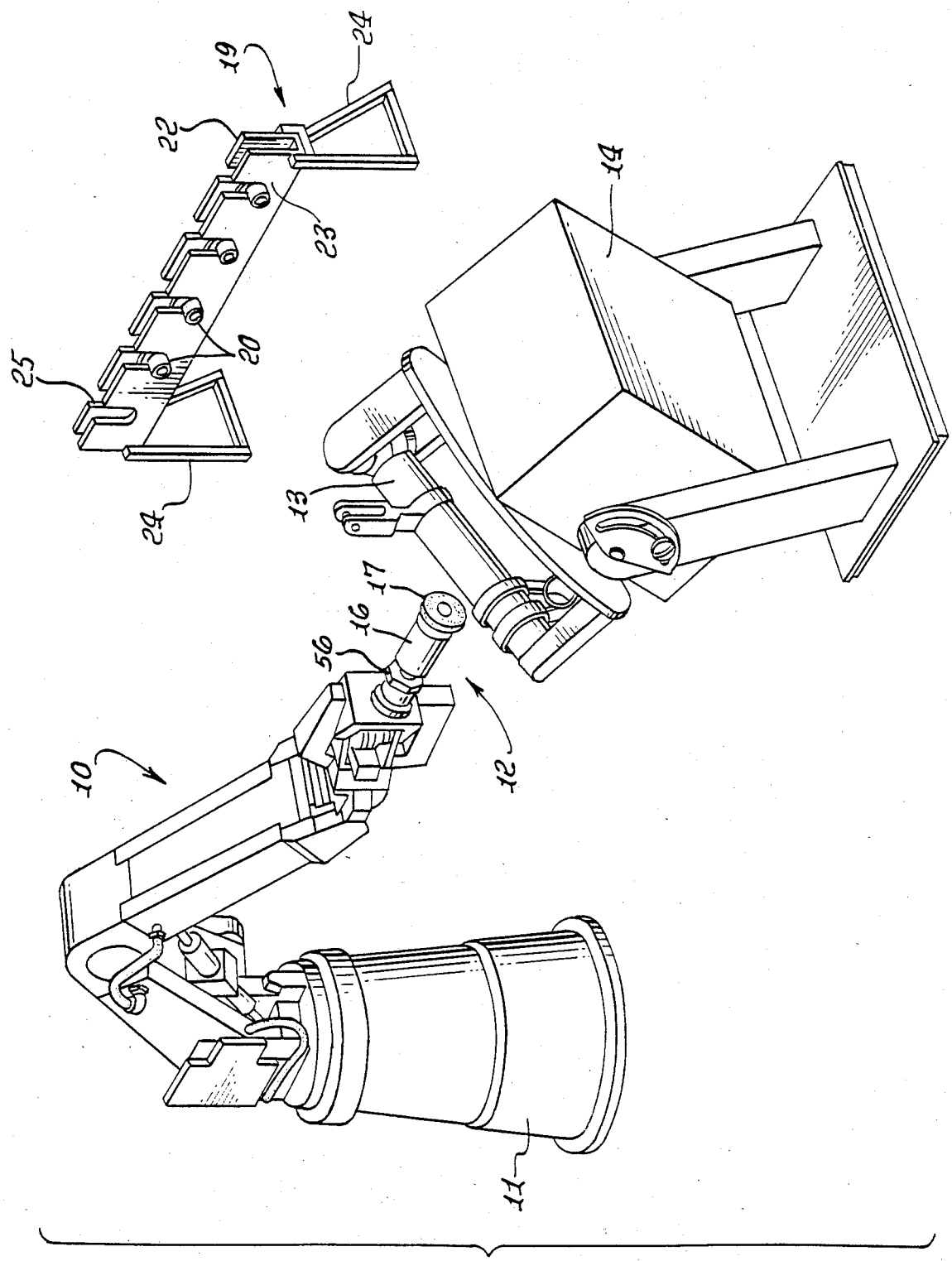
FIG. 1 is a perspective view illustrating a manipulator arm, a workpiece holder, and an end effector rack, incorporating the presently preferred embodiment of the invention.

The system illustrated in FIG. 1 includes a manipulator arm 10 mounted on a base 11 and carrying an end effector 12. A workpiece 13 is mounted in a workpiece holder 14. In the embodiment illustrated, the workpiece 13 is a metal casting, and the end effector 12 is a pneumatic motor 16 which drives a grind wheel 17 for doing work on the casting. The components described thus far may be conventional in nature. The system also includes an end effector rack 19 supporting a plurality of additional end effectors 20.

The end effector rack 19 typically comprises spaced plates 22, 23 supported on legs 24, with aligned slots 25 in the plates 22, 23 for receiving various end effectors.

Figure 2:
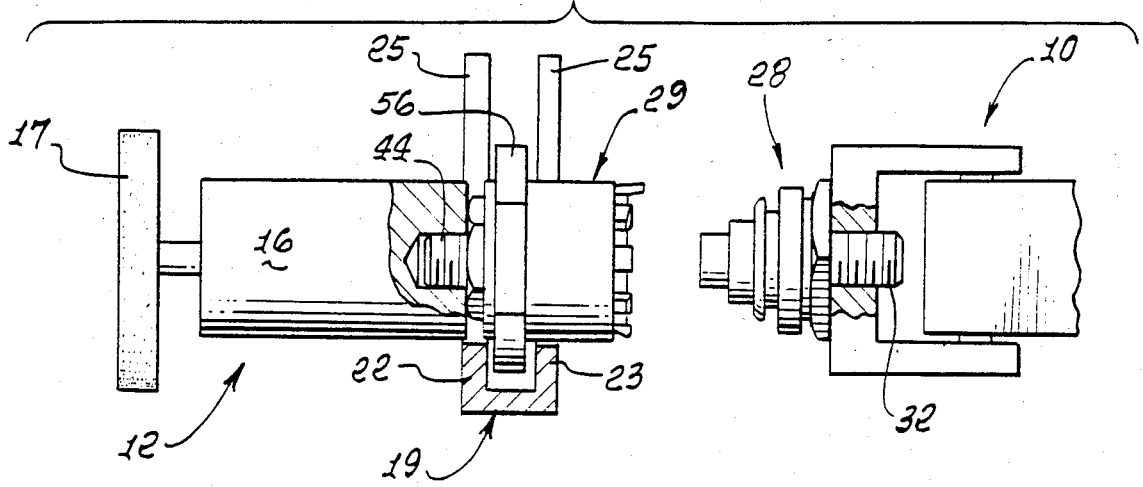
FIG. 2 is a side view, partly in section, illustrating the manipulator arm and end effector of the apparatus of FIG. 1 in the disengaged position.
Figure 3:
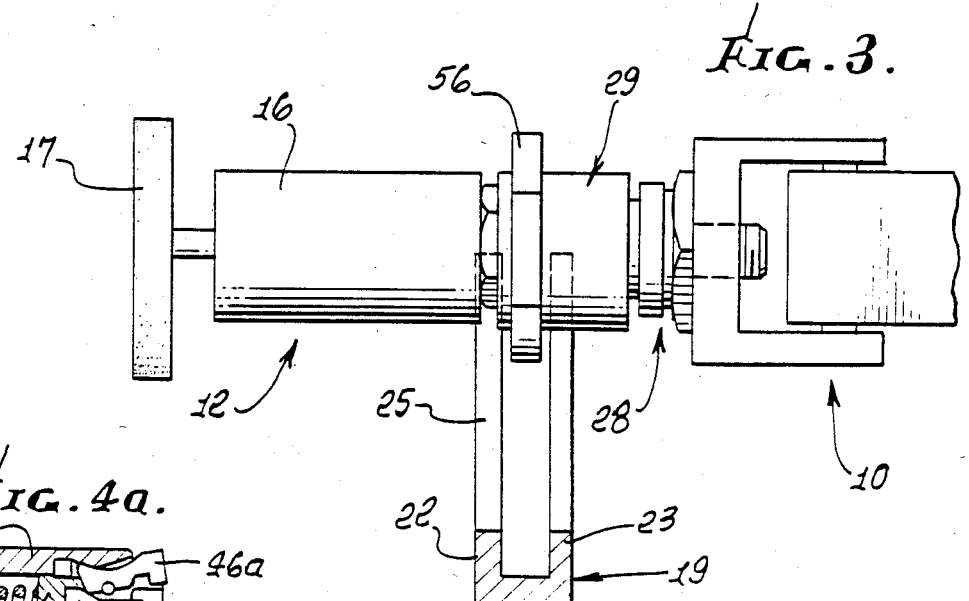
FIG. 3 is a view similar to that of FIG. 2 showing the components in the engaged condition.
Figure 4A:
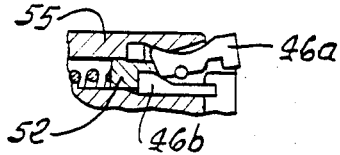
FIG. 4a is a partial view showing another dog of FIG. 4.
Figure 4:
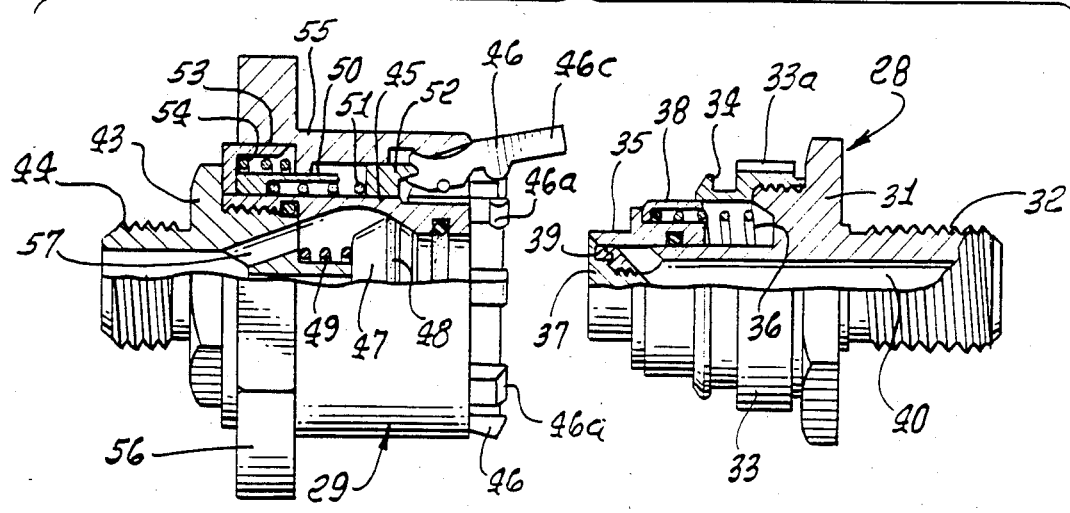
FIG. 4 is an enlarged view of a portion of FIG. 2 illustrating details of a coupling suitable for use with the invention and providing for fluid flow between the manipulator arm and end effectors.

As shown in FIGS. 2-4, the system of FIG. 1 includes a coupling having a nipple member 28 and a socket member 29 and in the embodiment illustrated, the nipple member 28 is mounted on the manipulator arm 10 and the socket member 29 forms a portion of the end effector 12 with the pneumatic motor 16.

A preferred form for the coupling members 28, 29 is shown in FIG. 4. The nipple member 28 includes a body 31 with a threaded end 32 for mounting on the manipulator arm. A ring 33 is mounted on the body 31 and includes an external annular groove 34. A plunger 35 is slidingly positioned on the body 31 and is urged to the left by a spring 36, with the plunger being retained by a plug 37 carried at the left end of the body 31. An annular sleeve 38 covers the exposed portion of the spring 37 and moves with the plunger 35. An annular seal 39 is mounted between the plug 37 and the body 31 in sealing engagement with the plunger 35. There is a fluid flow path 40 through the nipple member 28 which is closed by engagement of the plunger 35 with the seal 39.

The socket member 29 includes a body 43 with a threaded end 44 for engaging a tool or tool mount. An inner sleeve 45 is mounted on the body 43 and carries a plurality of pivoted dogs. Two styles of dogs are used alternatively; stay back dogs 46 and standard dogs 46a (FIG. 4a). Stay back rods 46b are positioned under the standard dogs 46a. A plunger 47 with a seal ring 48 slides on the body 43 and is urged to the right by a spring 49. A ring 50 about the sleeve 45 encloses a spring 51 urging another stay back ring 52 into engagement with the dogs 46 and 46a. Another ring 53 encloses another spring 54 which urges an outer actuating ring 55 to the right. The outer ring 55 includes an outwardly extending flange 56. There is a flow path 57 through the socket member which is closed by the plunger 47 and seal 48 in the position shown in FIG. 4.

In one embodiment of the coupling, means are included to limit relative rotation of the nipple and socket members 28, 29. In the embodiment illustrated in FIG. 4, one of the dogs 46 has an extension 46c which is engageable with a slot 33a in the ring 33. When the coupling members are being joined, one is rotated relative to the other so as to bring the extension 46a into the slot 33a, thereby preventing further relative rotation of the two coupling members.

In use, the coupling members are engaged by inserting a nipple member into the socket member with an axial compression force, that is by a linear motion. The plug 37 engages the plunger 47 and pushes the plunger to the left, opening the flow path through the socket member. At the same time, the inner sleeve 45 engages the plunger 35 pushing the plunger to the right and opening the flow path 40 in the nipple member. The left end of the ring 33 contacts the rods 46b which move the ring 52 back, compressing the spring 51. This movement of the ring 52 releases the tails of the stay back dogs 46 permitting dog rotation to engage the dogs in the groove 34. Also, the outer ring 55 is moved to the right by the spring 54 to hold the dogs in the annular groove 34, locking the two members together.

The members are separated by the reverse action, that is by applying a pulling or tension force on the body 31 of the nipple member 28 and on the outer ring 55 of the socket member 29. Movement of the outer ring 55 cams the dogs 46, 46a open, and the stay back ring 52 moves over the tail of the stay back dogs 46 and the nipple member 28 is released. The stay back rods 46b are extended from the face of the socket member 29 by the stay back ring 52. Thus it is seen that the coupling members may be engaged and disengaged by a simple linear motion. A conventional coupling may be utilized for this portion of the system of the invention.

The use of the linear coupling for tool changing in conjunction with the end effector rack is illustrated in FIGS. 2 and 3. In FIG. 2, the end effector 12 is resting in the slots 25 of the rack 19, with the flange 56 of the end effector coupling member 29 between the plates 22, 23. The nipple member 28 of the coupling is positioned at the socket member 29 by the manipulator arm 10, and is pushed into the socket member to engage the coupling members.

The coupling members are shown engaged in FIG. 3, and the end effector is in the process of being removed from the end effector rack by a lateral motion of the manipulator arm. Once the end effector is clear of the rack, the manipulator arm with end effector is ready for performing its work. When it is desired to change tools, the end effector is replaced in the rack by a lateral movement, and the nipple member is disengaged from the socket member by a linear pulling force, with the flange 56 engaging the plate 23 to restrain the socket member. Then the manipulator arm is moved to the desired end effector and the cycle is repeated.

Either or both of the coupling members may be produced separately as shown in the embodiment of FIGS. 2–4, or may be formed integrally with the manipulator arm and with the tool. And of course, a manipulator arm with an integral coupling member may be used with an end effector with a separate coupling member, and vice versa. The coupling members of FIGS. 2–4 provide for fluid flow from the manipulator arm to the end effector, with both coupling members incorporating valving for closing the flow paths through the coupling members when the members are separated. A number of alternative coupling member configurations are shown in FIGS. 5–9.

Figure 5:
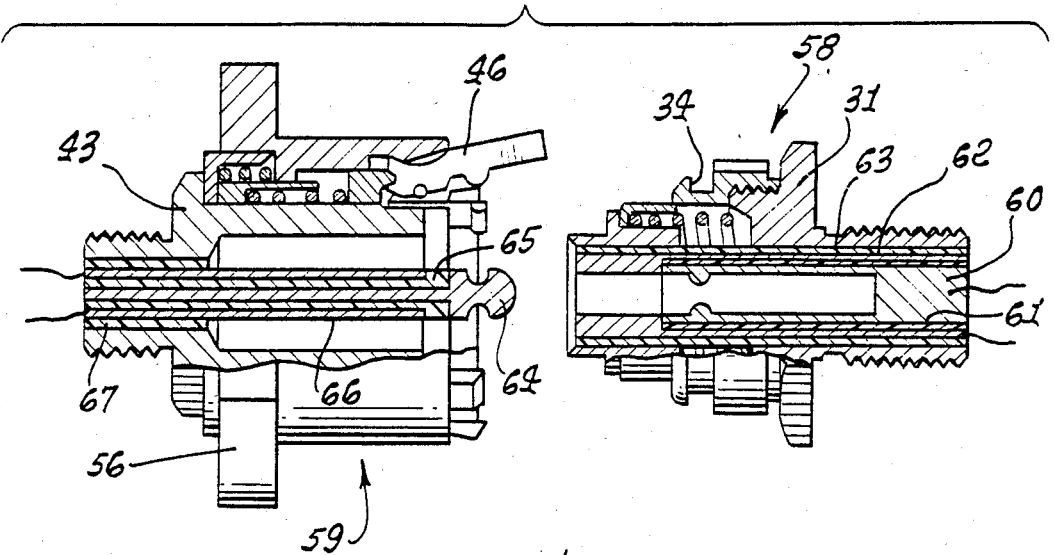
FIG. 5 is a view similar to that of FIG. 4 illustrating a coupling providing for electrical power or electrical signal transmission through the coupling.

The configuration of FIG. 5 provides two electrical paths between the nipple member 58 and the socket member 59. The two members are locked together by use of the dogs 46 and groove 34, as in the coupling of FIG. 4, and components corresponding to those of FIG. 4, are identified by the same reference numbers. An inner conductor 60, an insulating sleeve 61, an outer conductor 62 and another insulating sleeve 63 are carried in the body 31 of the nipple member 58. An inner conductor 64, an insulating sleeve 65, an outer conductor 66 and another insulating sleeve are carried in the body 43 of the socket member 59. When the members 58, 59 are joined, electrical contact is provided between the inner conductors 60, 64 and between the outer conductors 62, 66. The coupling of FIG. 5 is utilized in the same manner as the coupling in FIGS. 2–4, and the two electrical paths can be utilized for transmitting electrical power to a tool or for transmitting an electrical signal or for receiving electrical signals from a sensor or transducer.

Figure 6:
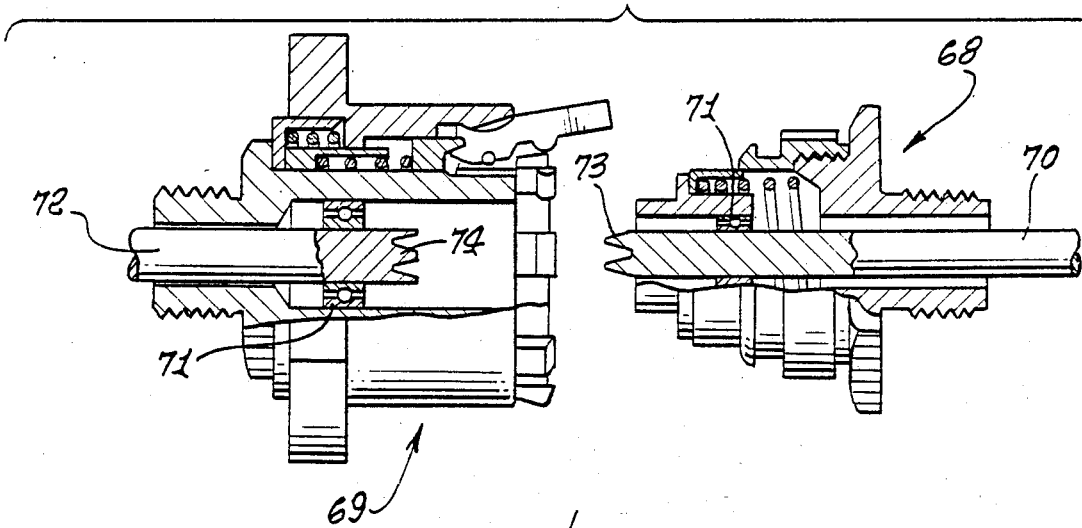
FIG. 6 is a view similar to that of FIGS. 4 and 5 illustrating a coupling suitable for transmission of rotary motion.

An alternative form of coupling with nipple member 68 and socket member 69 for transmitting rotating shaft motion is shown in FIG. 6. A shaft 70 is mounted in a bearing 71 in the nipple member 68, and a similar shaft 72 is mounted in another bearing 71 in the socket member 69. The ends 73, 74 of the shafts are slotted or otherwise formed to have a mating interengagement for driving the shaft 72 by the shaft 70.

Figure 7:
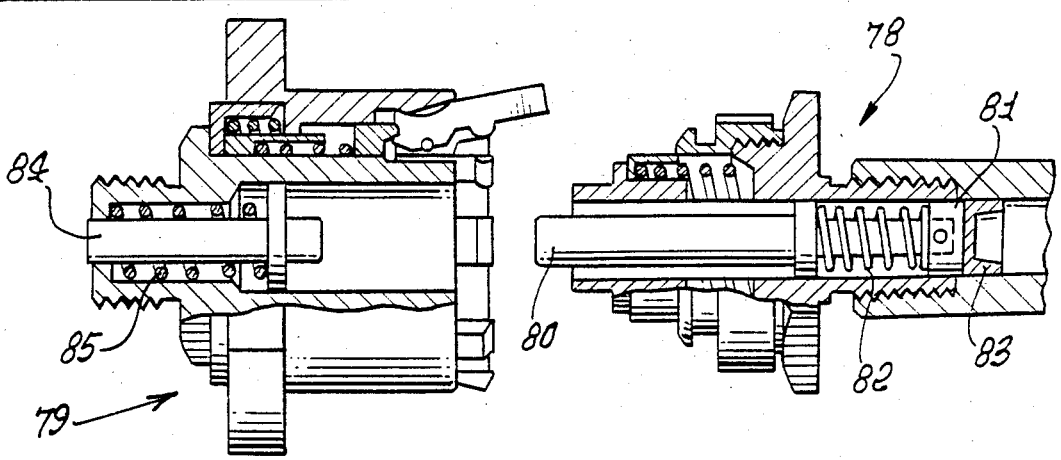
FIG. 7 is a view similar to FIGS. 4–6 showing a coupling suitable for transmission of linear motion.

Another coupling configuration for transmitting linear motion is shown in FIG. 7, with a shaft 80 driven by a piston 81 mounted within the nipple member 78. In the embodiment illustrated, the shaft is urged to the right by a spring 82 and is moved to the left by pressure acting against a seal 83 of the piston 81. Another shaft 84 is mounted in the socket member 79 and urged to the right by spring 85. The shaft 84 is engaged by the shaft 80 when the coupling members are engaged.

Another alternative embodiment is shown in FIG. 8 which utilizes an intermediate unit 87 between the manipulator arm 10 and the end effector 12. The utilization of an intermediate unit such as the unit 87 provides for a wider flexibility in choice of components. In the specific embodiment illustrated, two of the fluid flow couplings of FIG. 4 are utilized between the manipulator arm 10 and the intermediate unit 87, and one of the rotational drive coupings of FIG. 7 is utilized between the intermediate unit 87 and the end effector 12. A hydraulic motor may be incorporated in the intermediate unit 87, with this motor powered by hydraulic fluid entering through one of the sets of coupling members 28, 29 and exiting through the other set. Alternatively, the motor could be a pneumatic motor, powered by air pressure through one of the coupling sets, with a control function provided through the other of the coupling sets between the manipulator arm 10 and the intermediate unit 87. The intermediate unit 87 includes a flange 88 which permits positioning a plurality of such intermediate units in a rack, such as a rack 19, for changing intermediate units in the manner described above. Also, the end effector 12 may be changed in the manner described above, by utilizing the flange 56 of the coupling member 69.

Thus it is seen that various combinations of couplings, intermediate units and end effectors can be utilized with various types of drive and/or control, utilizing the tool changer of the present invention.

Another coupling configuration for providing three functional interconnections between manipulator arm and end effector is shown in FIG. 9. In this embodiment as illustrated, coupling nipple members 101, 102 and 103 are carried on a plate 104 which in turn is connected to the manipulator arm. Similarly, coupling socket members 105, 106 and 107 are carried on another plate 108 on which the tool or other components forming the end effector are mounted. With this configuration, T shaped slots 110 are utilized in the plates 23 and 24 of the end effector rack 19. The couplings may be any of those shown in FIGS. 2-8 or similar couplings. All of the coupling embodiments shown in FIGS. 5-9 are utilized in the same manner as the coupling of FIGS. 2-4, that is the coupling members are engaged by a linear push and are disengaged by a linear pull.

The tool changer of the invention provides a mechanical system for the detachment and attachment of different end effectors to a mechanical manipulator arm by mean of one directional linear motion of the attachment point on that arm with the coupling member on the end effector held in a rack, without additional mechanical powered or signalled action; and provides for the transmission of energy and communications for the end effectors requiring power or communications for their operation through the automatic change system without any additional actions, signals, or external power. The action of mating the coupling member mounted on the manipulator arm to the coupling member held by the end effector rack secures locking lugs, closes electrical contacts, opens valves, and provides for the engagement of a key or other restraints to relative rotary motion, if rotary motion between two components of the system is not desired. Also the tool changer of the invention provides for the detachment of an end effector, including the disconnection of electrical contacts and the closing of valves in both components of the system, by a linear motion of the manipulator arm away from the end effector held in the rack. The coupling action provides for positive restraint, requiring the distortion or fracturing of components to cause separation. Valves in both components are opened by the action of mating the components and are closed by the action of separating the components if fluid or gas flow is involved. Strength is provided by the holding action of the mechanical lugs around the periphery of the member mounted on the manipulator and the contact surfaces between the two mated coupling members. High resistance to separation or bending force is provided by use of multiple couplings in parallel.

I claim:

1. In a tool changer for use with a manipulator arm which provides a first movement along an axis and a second movement laterally to said axis, the combination of:

a coupling comprising a nipple member and a socket member with one of said members including means for connecting the member to the manipulator arm and with the other of said members including means for connecting the member to an end effector and flange means for engaging an end effector rack, and with said members being coupled together solely by an axial compression force and separated solely by an axial tension force without any external manipulation; and an end effector rack for receiving and supporting an end effector, said rack having means interengaging with said coupling member flange means for limiting movement of the end effector along the axis of said coupling while permitting movement laterally, whereby the manipulator arm can position an end effector in said rack solely by a lateral movement, disengage the arm from the end effector solely by an axial movement, engage the arm with an end effector solely by an axial movement in the opposite direction, and remove the end effector from the rack solely by a lateral movement.

2. A tool changer as defined in claim 1 wherein said coupling includes means providing a fluid flow path therethrough, with a sealing valve in each of said nipple and socket members when uncoupled.

3. A tool changer as defined in claim 1 wherein said coupling includes means providing first and second electrical paths therethrough, with first and second electrical contacts in said nipple member and first and second electrical contacts in said socket member, with said first contacts in engagement and said second contacts in engagement when said members are coupled.

4. A tool changer as defined in claim 1 including first and second rotating shafts mounted in said respective coupling members, with said shafts have interengaging ends for driving one by the other when said coupling members are coupled together.

5. A tool changer as defined in claim 1 including aligned shafts mounted in said respective coupling members for axial sliding movement, with said one coupling member including a piston engaging the coupling member shaft in driving relation.

6. A tool changer as defined in claim 1 including a second coupling comprising a second nipple member and a second socket member, with one of said second members including means for connecting the member to the manipulator arm, and with the other of said second members including mains for connecting the member to the end effector, and flange means for engaging said end effector rack.

7. A tool changer as defined in claim 1 including a second coupling comprising a second nipple member and a second socket member, and a third coupling comprising a third nipple member and a third socket member, with one of said second and third members including means for connecting the member to the manipulator arm, and with the other of said second and third members including means for connecting the member to the end effector, and flange means for engaging the end effector rack.

8. A tool changer as defined in claim 7 wherein said end effector rack includes first and second spaced plates with T shaped slots therein for receiving said coupling members with said flange means in the space between said plates.

9. A tool changer as defined in claim 1 wherein said nipple and socket members include interengaging means for limiting rotation of one of said members with respect to the other.

* * * * *

UNITED STATES PATENT AND TRADEMARK OFFICE
CERTIFICATE OF CORRECTION

PATENT NO. : 4,604,787

DATED : August 12, 1986

INVENTOR(S) : Ralph H. Sievers, Jr.

It is certified that error appears in the above-identified patent and that said Letters Patent is hereby corrected as shown below:

Please correct the inventor's name from "Silvers"

to --Sievers--

Signed and Sealed this

Twenty-eighth Day of October, 1986

[SEAL]

*Attest:*

DONALD J. QUIGG

*Attesting Officer*      *Commissioner of Patents and Trademarks*